United States Patent
Schneider et al.

(10) Patent No.: US 6,513,882 B1
(45) Date of Patent: Feb. 4, 2003

(54) BRAKING ASSEMBLY

(75) Inventors: Michael John Schneider, Bloomfield Township, MI (US); Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/633,213

(22) Filed: Aug. 7, 2000

(51) Int. Cl.⁷ .................................................. B60T 8/52
(52) U.S. Cl. ........................................................ 303/112
(58) Field of Search ............................... 303/152, 112, 303/191; 701/22

(56) References Cited

U.S. PATENT DOCUMENTS

| | | | |
|---|---|---|---|
| 4,632,208 A | * 12/1986 | Takayama et al. | 180/271 |
| 4,908,553 A | 3/1990 | Hoppie et al. | |
| 5,031,968 A | 7/1991 | Takata | |
| 5,147,114 A | 9/1992 | Hommen et al. | |
| 5,433,512 A | * 7/1995 | Aoki et al. | 303/3 |
| 5,762,407 A | 6/1998 | Stacey et al. | |
| 5,816,667 A | 10/1998 | Jokic | |
| 5,913,377 A | * 6/1999 | Ota et al. | 180/244 |
| 5,921,641 A | * 7/1999 | Lupges et al. | 303/191 |
| 6,007,160 A | * 12/1999 | Lubbers et al. | 303/114.1 |
| 6,132,015 A | * 10/2000 | Aoyama | 303/152 |
| 6,176,556 B1 | * 1/2001 | Kizer | 303/152 |
| 6,231,135 B1 | * 5/2001 | Bower et al. | 303/152 |
| 6,244,676 B1 | * 6/2001 | Watanabe et al. | 303/191 |
| 6,254,202 B1 | * 7/2001 | Kawamoto | 303/122.09 |

FOREIGN PATENT DOCUMENTS

JP          402013202 A    *  1/1990

* cited by examiner

Primary Examiner—Christopher P. Schwartz
Assistant Examiner—Xuan Lan Nguyen
(74) Attorney, Agent, or Firm—Gregory P. Brown

(57) ABSTRACT

A brake assembly 12 for use within an electric vehicle 10 and which allows the vehicle 10 to be selectively decelerated in substantially the same manner as is an internal combustion engine type vehicle upon the release of an accelerator pedal member 18 or the depression of a brake member 20.

4 Claims, 1 Drawing Sheet

BRAKING ASSEMBLY

FIELD OF THE INVENTION

The present invention generally relates to a braking assembly and more particularly, to a braking assembly which is deployed within an electric vehicle and which selectively provides vehicular deceleration, effective to provide the occupants of the vehicle with substantially the same "sense" or "feel" as is provided by the compression braking of an internal combustion engine type of vehicle.

BACKGROUND OF THE INVENTION

Compression braking of an internal combustion engine typically occurs as the accelerator pedal is released, and is effective to allow the occupants, of the internal combustion type vehicle, to gain a "sense" or "feel" of deceleration. It is desirable to provide substantially the same "sense" or "feel" in an electric vehicle and to substantially prevent the vehicle occupants from "sensing" a coasting type of operation, thereby allowing an electrical vehicle to "imitate" well known and desirable attributes of an internal combustion engine type vehicle.

Attempts to provide such compression braking in an electric vehicle typically require the communication of torque or energy from a motor to an electric battery. While these attempts do allow compression braking to occur, they are not reliable since they require the existence of some energy storage capability within the battery and, if the battery is substantially and fully charged, these attempts do not provide the required braking. Moreover, in order for such energy to be effectively communicated, the battery must operatively reside within a certain temperature range and the powertrain must operate below a certain operating temperature. Therefore, these prior attempts provide inconsistent operation.

Further, many electric vehicles do not have electrical batteries. Rather, these "other types" of electric vehicles employ fuel cell assemblies which are not adapted to receive the energy from the motor in the foregoing manner. Such prior attempts are therefore not effective in these fuel cell type vehicles. In order to overcome these drawbacks, other attempts have utilized a relatively complicated and expensive "brake by wire system".

There is therefore a need for a braking system which overcomes at least some of the previously delineated drawbacks of prior braking systems and which, by way of example and without limitation, efficiently provides compression braking within an electric vehicle, effective to provide the occupants of the electric vehicle with substantially the same "feel" or "sense" of deceleration as is provided within an internal combustion engine type vehicle.

SUMMARY OF THE INVENTION

It is a first object of the present invention to provide a braking assembly which overcomes at least some of the previously delineated drawbacks of prior braking assemblies.

It is a second object of the present invention to provide a braking assembly which overcomes at least some of the previously delineated drawbacks of prior braking assemblies and which, by way of example and without limitation, provides compression braking within an electric vehicle.

It is a third object of the present invention to provide a method for producing compression braking which is substantially independent of the operating temperature of an electric vehicle, which is substantially independent of the amount of electrical charge contained within a battery, and which is independent of the type of fuel source which is utilized within the vehicle.

According to a first aspect of the present invention a braking assembly is provided. The braking assembly includes a selectively actuated booster which provides negative torque to a wheel in response to a sensed position of an accelerator pedal member.

According to a second aspect of the present invention a method is provided for decelerating an electric vehicle. The method includes the steps of sensing the position of a member; and activating a booster member in response to the sensed position of the member.

These and other features, aspects, and advantages of the present invention will become apparent from a reading of the following detailed description of the preferred embodiment of the invention and by reference to the following drawing.

DETAILED DESCRIPTION OF THE PREFERRED EMBODIMENT OF THE INVENTION

Figure 1:
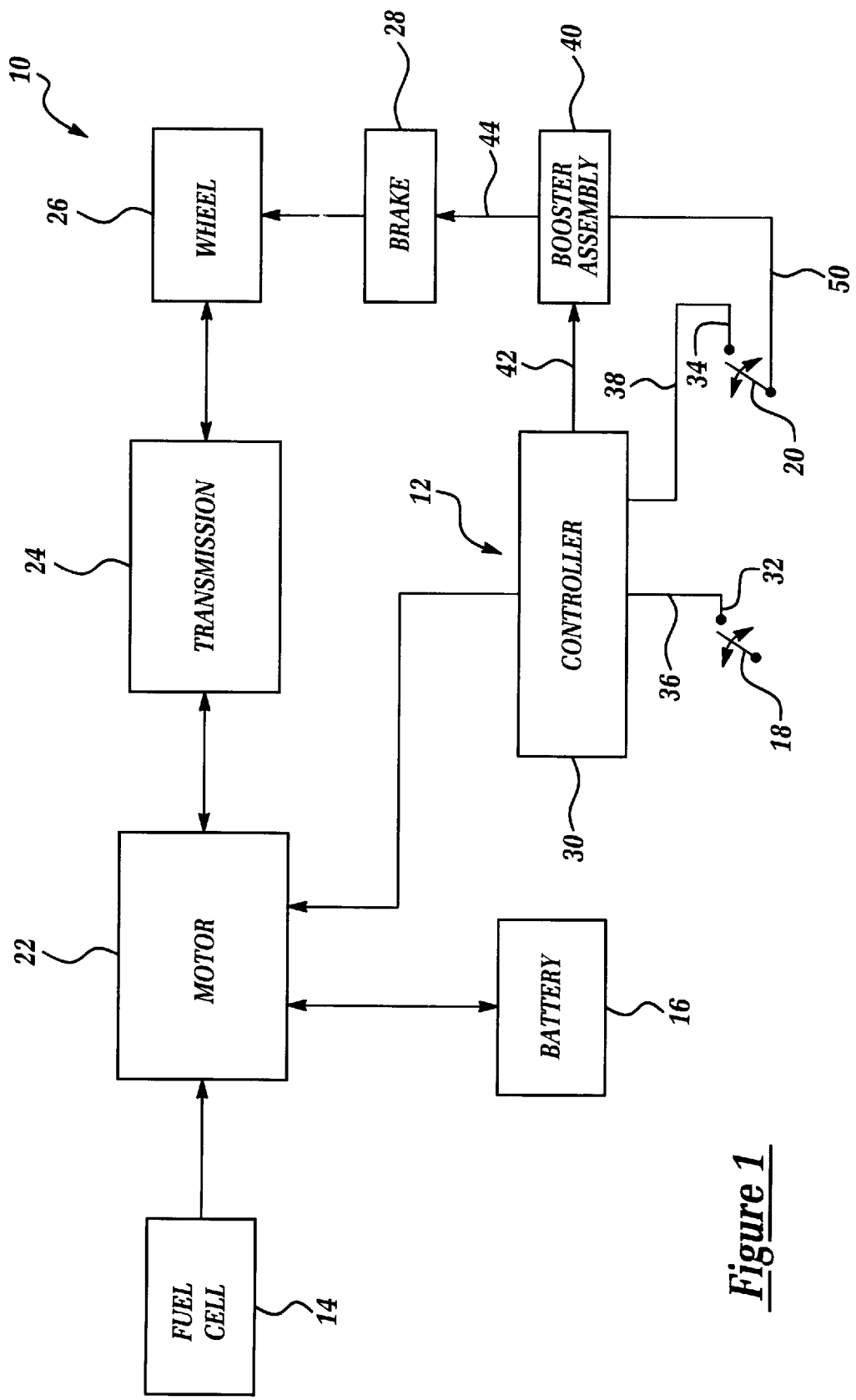
FIG. 1 is a partial block diagram of an electric vehicle which incorporates a brake assembly which is made in accordance with the teachings of the preferred embodiment of the invention.

Referring now to FIG. 1, there is shown a partial block diagram 10 of an electric vehicle having a brake assembly 12 which is made in accordance with the teachings of the preferred embodiment of the invention.

As shown, vehicle 10 includes at least one source of electrical energy and, by way of example and without limitation, this source of electrical energy may comprise a fuel cell assembly 14 and/or an electric battery 16. Vehicle 10 further includes a selectively movable accelerator pedal member 18 and a selectively movable brake pedal member 20. Further, vehicle 10 includes a torque generation member or assembly, such as a motor, 22; a powertrain assembly or transmission assembly 24; several wheels, such as wheel 26; and several brakes, such as brake 28.

While the following discussion describes the use of brake assembly 28 to selectively provide negative torque to the wheel 26, it should be realized that other brakes (not shown) may operatively reside within vehicle 10 and may be similarly caused to respectively provide negative torque to the other wheels operatively residing within vehicle 10 (not shown) in substantially the same manner as is set forth below. Motor 22 is operatively coupled to the transmission assembly 24 and the transmission assembly 24 is operatively coupled to the wheels, such as wheel 26, in a known and conventional manner. Each of the brakes are uniquely coupled and associated with a unique one of the wheels and, as shown, brake 28 is operatively coupled to the wheel 26.

In operation, energy is provided to the motor 22, by the fuel cell assembly 14 and/or by the battery 16, effective to allow the motor 22 to produce torque. The produced torque is communicated to the transmission assembly 24 and the transmission assembly 24 provides at least a portion of the received torque to the wheels, such as to wheel 26. The depression of the accelerator pedal member 18 causes an increased amount of energy to be provided to the motor 22, thereby causing the motor 22 to produce a greater amount of torque and causing the vehicle 10 to operate at a greater or faster speed. The brakes, such as brake 28, may selectively apply negative torque to the wheels, such as to wheel 26, upon the release of the accelerator pedal member 18 and/or the depression of the brake pedal member 20, effective to cause the vehicle 10 to decelerate.

Assembly 12 includes a controller 30 which is operable under stored program control and two position sensors 32, 34. Particularly, each sensor 32, 34 respectively senses the position of the accelerator pedal member 18 and the brake pedal member 20. Moreover, each sensor is physically, communicatively, and controllably coupled to the controller 30 by use of respective busses 36, 38 and each sensor 32, 34 provides respective position information to the controller 30 by the use of these respective busses 36, 38. Further, assembly 12 includes a booster assembly 40, typically including a master cylinder (not shown) which is physically, communicatively, and controllably coupled to the controller 30 by the use of bus 42 and which is physically, communicatively, and controllably coupled to the brakes, such as brake 28, by use of bus 44. Booster assembly 40 is also physically and operatively coupled to the brake member 20 by bus 50.

In operation, upon receipt of position information from the sensors 32, 34 which indicates a desired deceleration (i.e., indicating a release of accelerator pedal member 18 or a depression of brake member 20), controller 30 generates a signal, onto bus 42, effective to cause the booster assembly 40 to activate the brake 28 by an amount which is proportional to the desired amount of deceleration (e.g., is proportional to the amount of sensed movement of members 18, 20), and provide negative torque to the wheel 26, thereby decelerating the vehicle 10 and providing the occupants of the vehicle 10 with substantially the same "feel" or "sense" as provided by an internal combustion engine type vehicle. The use of controller 30 and booster assembly 40 therefore allows the negative torque to be provided in an efficient and cost effective manner. Further, the generation of such negative torque is independent of the operating temperature of the motor 22, battery 16, and transmission 24 and is independent of the type of energy source 14, 16 utilized within vehicle 10.

It is to be understood that the invention is not limited to the exact construction and method which has been illustrated and described above, but that various changes and modifications may be made without departing from the spirit and the scope of the invention and is further delineated in the following claims.

What is claimed is:

1. A method for decelerating an electric vehicle, said method comprising tho steps of:

providing a brake pedal position sensor which is effective to sense movement of a brake pedal;

providing a accelerator pedal position sensor which is effective to sense movement of an accelerator pedal;

sensing a depression movement of a brake pedal and sewing a releasing movement of an accelerator pedal;

activating a booster member in response to said sensed depression movement of said brake pedal; and activating a booster member in response to said sensed releasing movement of said accelerator pedal.

2. The method of claim 1 wherein said activation of said booster is effective to provide negative torque to a wheel.

3. The method of claim 2 wherein the amount of said negative torque is proportional to a amount of movement of sad brake pedal.

4. The method of claim 3 wherein said electric vehicle includes a battery at a certain temperature and wherein said activation of said booster occurs independently of said temperature of said battery.

* * * * *